Nov. 24, 1970    J. E. BLASTIC ET AL    3,542,974
ELECTRICAL TRANSDUCER
Original Filed Dec. 15, 1969    5 Sheets-Sheet 1
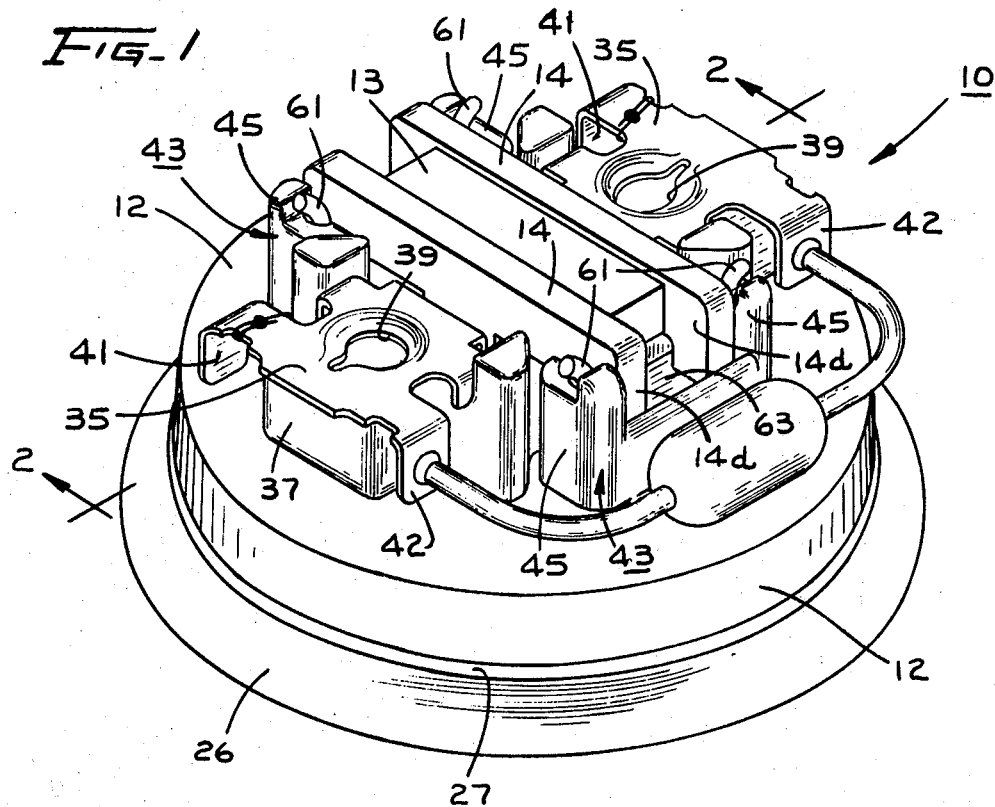
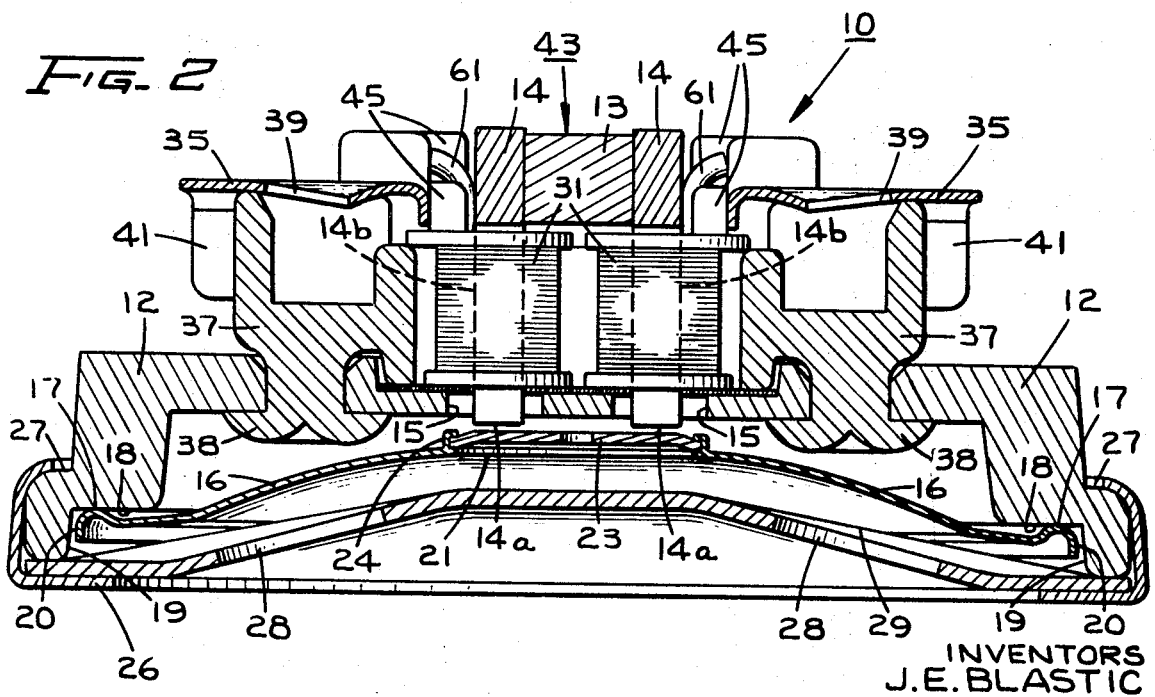
INVENTORS
J. E. BLASTIC
N. B. KARAU
A. F. KERR
BY
ATTORNEY

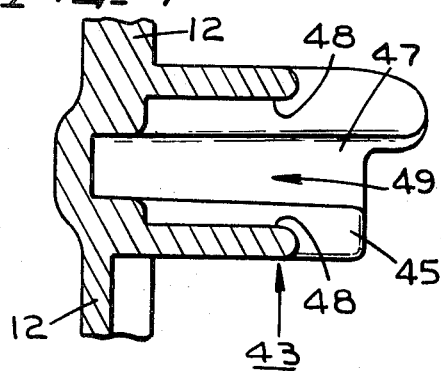
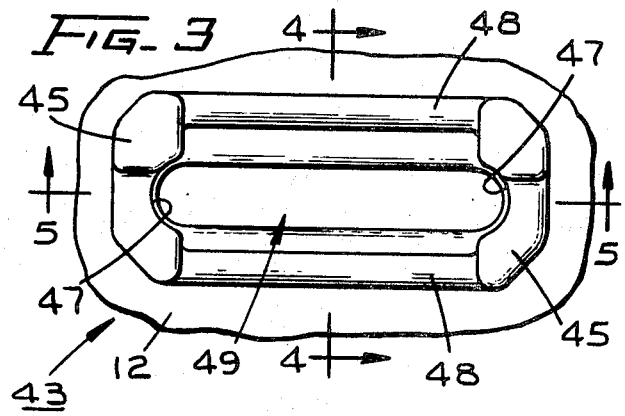
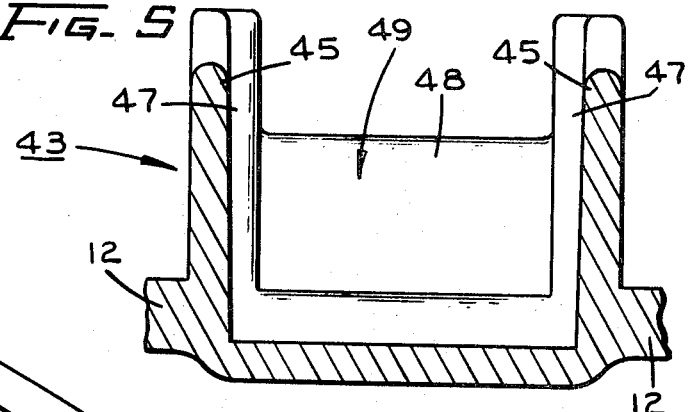
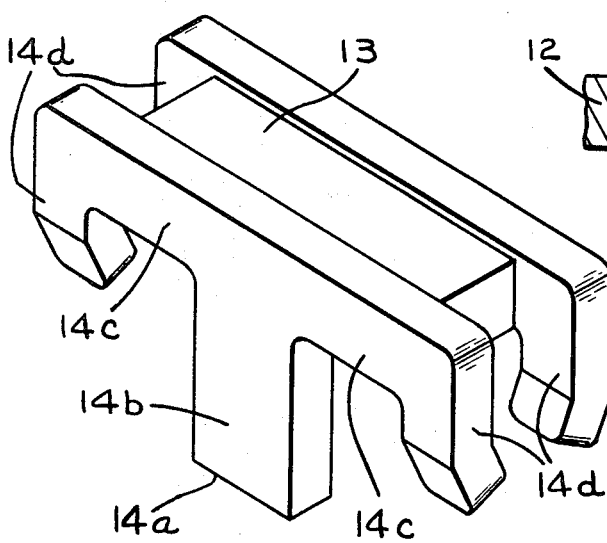
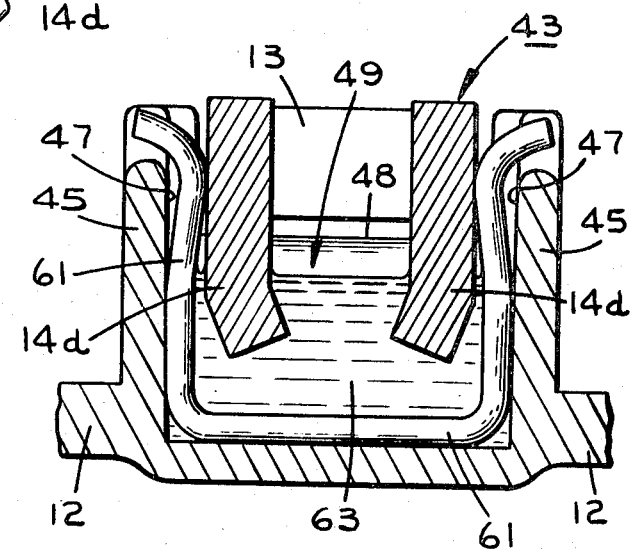

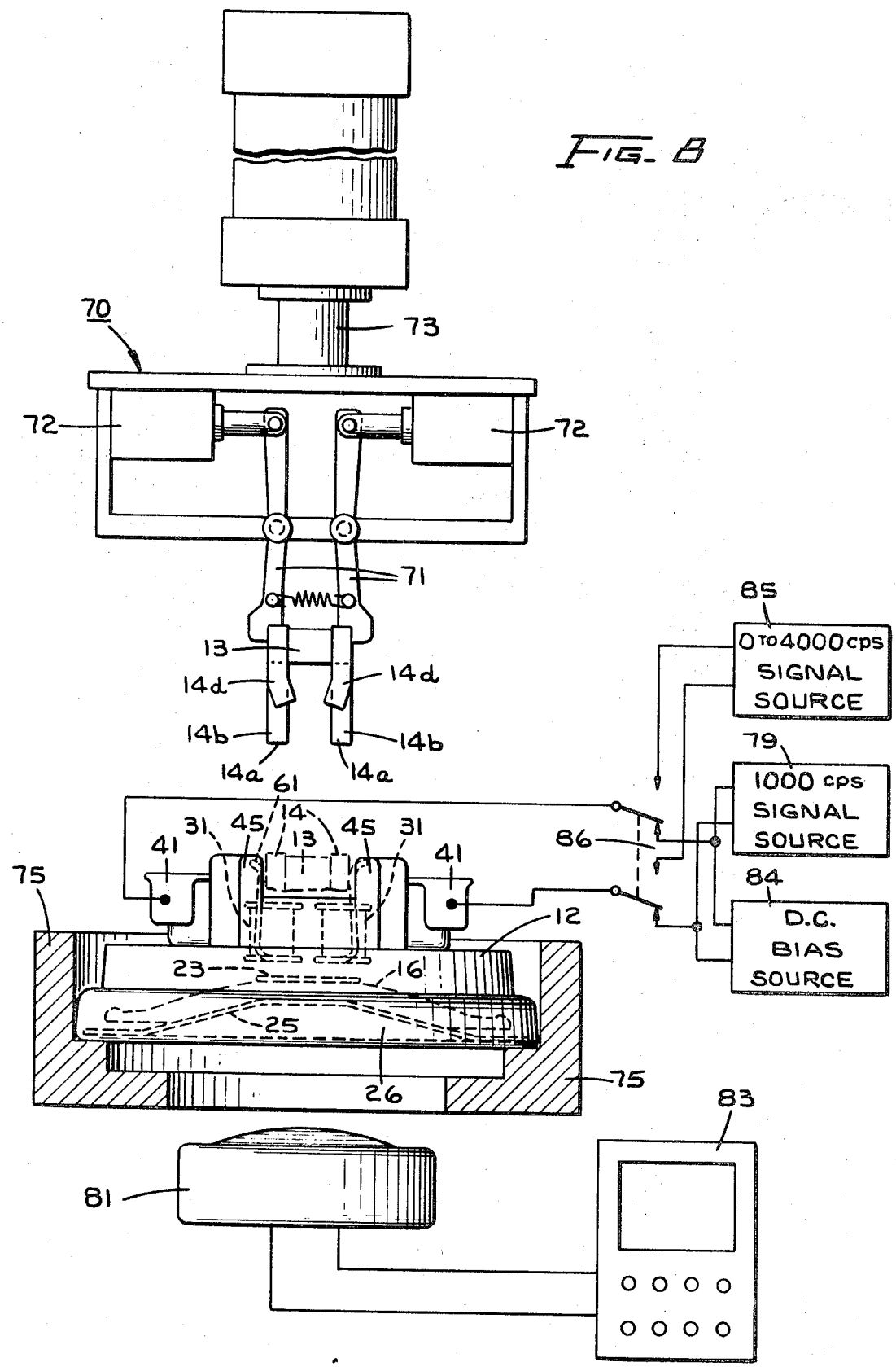

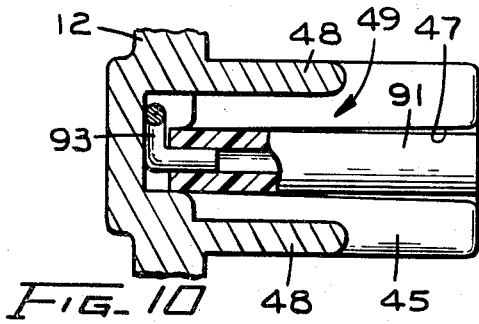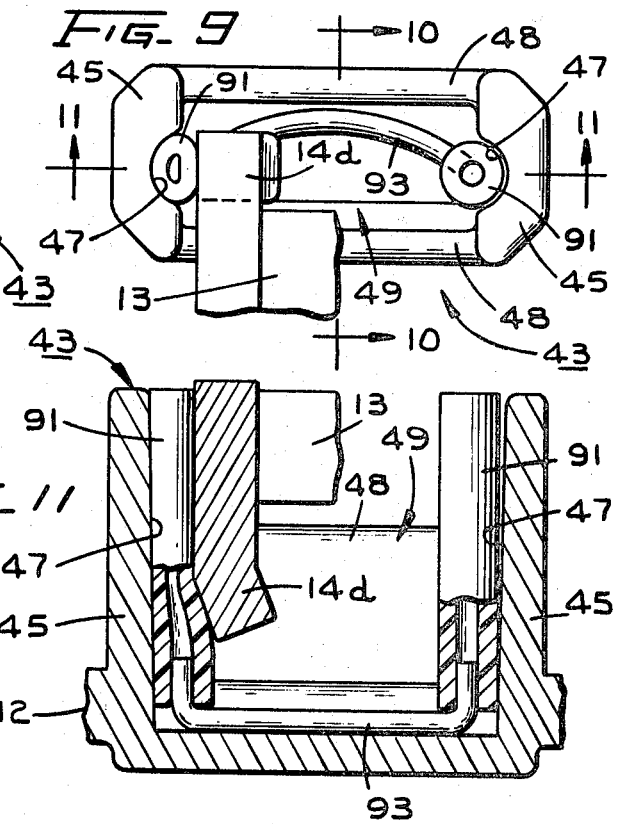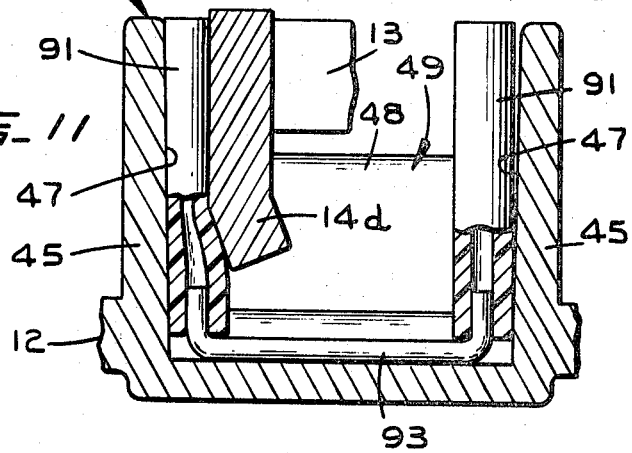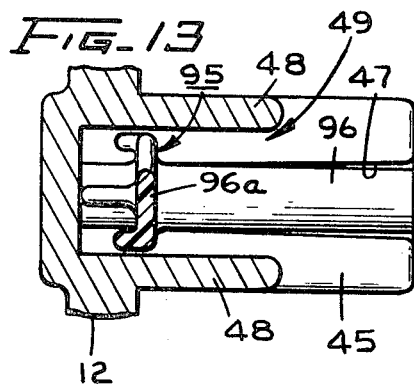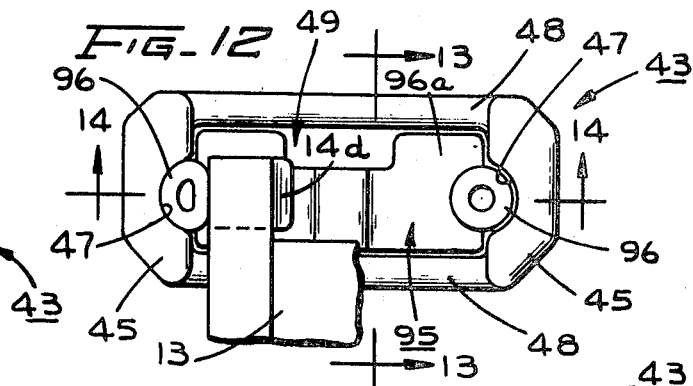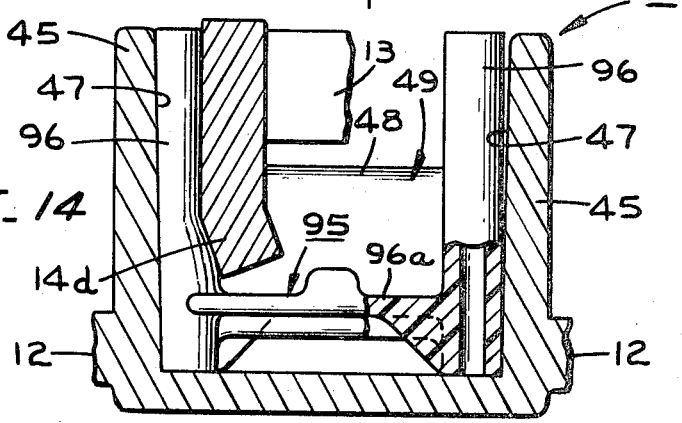

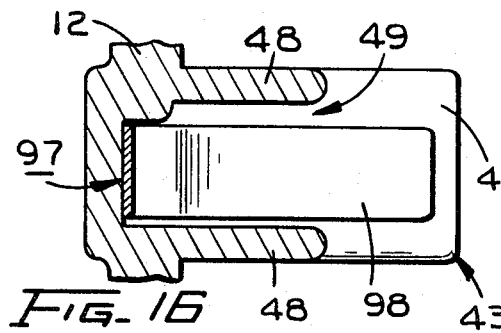
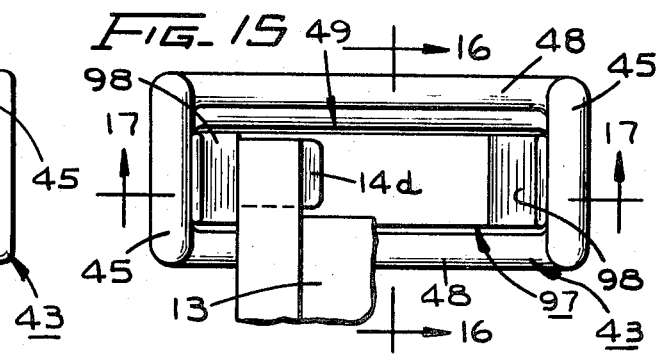
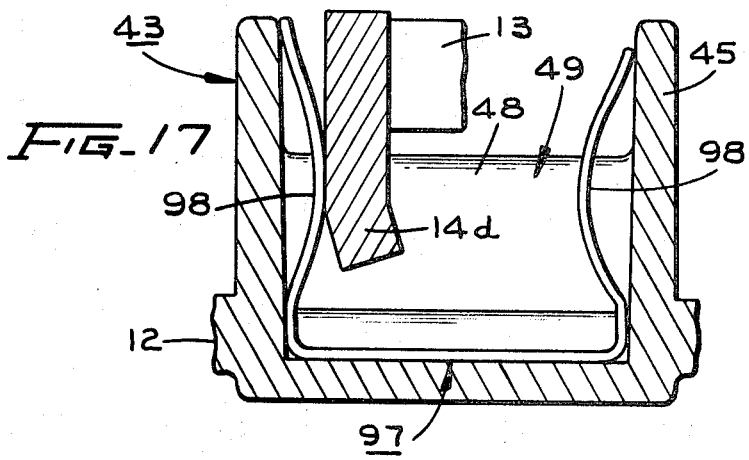
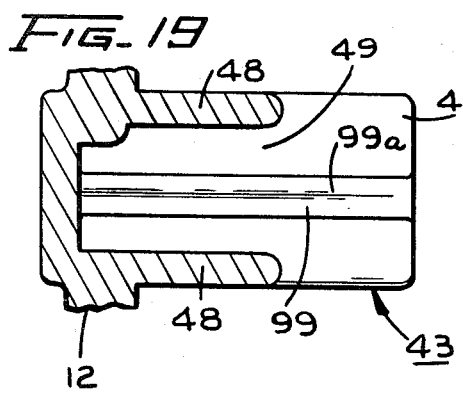
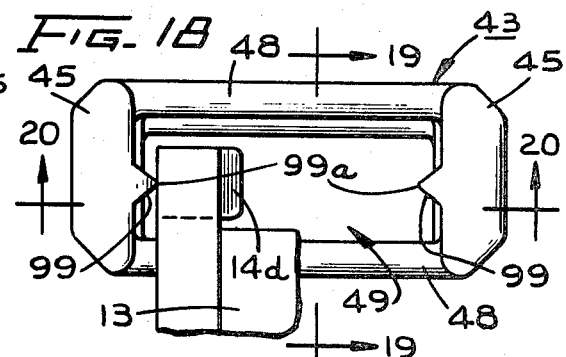
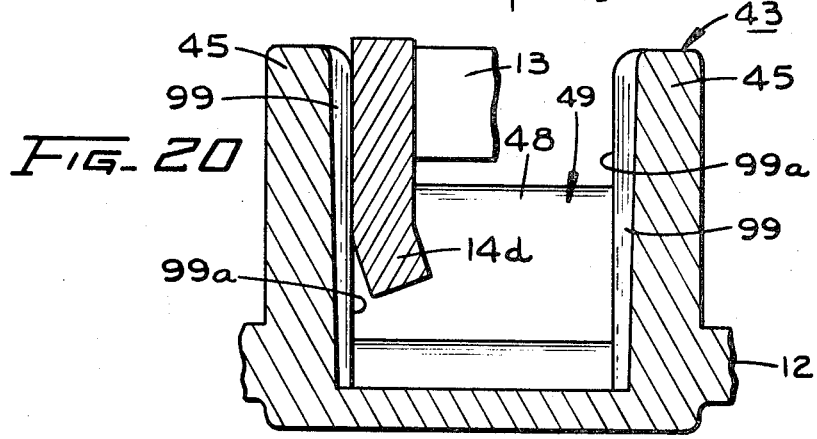

United States Patent Office 3,542,974
Patented Nov. 24, 1970

3,542,974
ELECTRICAL TRANSDUCER
Joseph E. Blastic and Norbert B. Karau, Indianapolis, and Archie F. Kerr, Noblesville, Ind., assignors to Western Electric Company, Incorporated, New York, N.Y., a corporation of New York
Original application Dec. 15, 1969, Ser. No. 889,797. Divided and this application June 14, 1968, Ser. No. 737,164
Int. Cl. H04r 9/02
U.S. Cl. 179—117                                    12 Claims

ABSTRACT OF THE DISCLOSURE

The air gap adjustment and final assembly of electrical transducers of the central armature type, such as those employed as receivers in telephone sets, is accomplished by adapting the receiver frame to engage frictionally and temporarily support the magnet-pole piece assembly during the adjustment of the air gap. Both an A.C. signal and a selectively variable D.C. bias, simultaneously applied to the coils of the receiver, are employed in determining the proper air gap spacing which results in the receiver producing an optimum value of acoustic output falling within predetermined minimum limits. After adjusting the air gap, a solidifiable liquid cement or a suitable potting compound is employed to secure the magnet-pole piece assembly permanently and rigidly to the frame of the receiver.

BACKGROUND OF THE INVENTION

Field of the invention

The invention is concerned with electrical transducers and, more, particularly, with central armature type receiver units, hereinafter generally referred to simply as receivers, and with methods of adjusting the air gap and finally assembling such receivers. These receivers are often employed in performance demanding applications, such as in telephones, for which use considerable care is necessarily required in their manufacture. Particularly is this true with respect to establishing the proper air gap spacing for each receiver, as this parameter has a direct and significant bearing on the level of acoustic output, as well as on the degree of stability attained.

This is the parent of divisional co-pending application Ser. No. 889,797, filed Dec. 15, 1969.

Description of the prior art

Central armature type receivers used in telephones heretofore have normally comprised a generally cylindrical die cast frame, with a magnet-pole piece assembly secured by weldments to the rearward side of the frame, and a diaphragm-armature assembly supported in substantially free space relationship with respect to the central portion of the frame on the forward side thereof. Induction coils associated with the magnet-pole piece assembly are employed to impart magnetomotive forces to the diaphragm-armature assembly, these forces fluctuating in accordance with the variations in magnitude of the electrical signals applied to the coils. It is the resultant magnetic force-induced movement of the diaphragm-armature assembly, of course, that produces the acoustic output of the receiver.

In order to improve the uniformity and optimize the acoustic output characteristics of the above-described type of central armature receiver, a number of "static" air gap adjusting techniques have been employed heretofore with varying degrees of less than satisfactory success. By "static" is meant an adjusting technique involving only physical displacement of the magnet-pole piece assembly relative to the diaphragm-armature assembly, whereas such movement simultaneously accompanied by acoustic displacement of the diaphragm-armature assembly through signal energization of the coils, will be referred to hereinafter as a "dynamic" air gap adjusting technique.

In all of the prior known air gap adjusting methods, various types of precisely controlled physical displacement of the diaphragm-armature assembly, either by the use of fixed forces, fixed displacements or a combination thereof, have been required, all with the intent of compensating for the troublesome physical variations selectively exhibited by the diaphragms. That such "static" air gap adjusting techniques would not always produce optimum air gap spacings for every receiver is perhaps best understood by initially examining the various characteristics of the diaphragms which lead to variations in the resultant air gap spacings whenever the diaphragm-armature assemblies are subjected to the same type of "static" imparted deflections. The diaphragm characteristics in question pertain to (1) variations in stiffness, (2) non-linear force deflection characteristics, (3) variations in height, and (4) variations in diaphragm shrinkage resulting from the welding of the magnet-pole piece assembly to the frame during fabrication, such shrinkage causing undesirable variations in or growth of the air gap between the armature and the pole pieces.

With respect to these characteristics, the one relating to inherent stiffness variations encountered in the diaphragms, as manufactured, has proven to be the most difficult to cope with in the assembly of performance-demanding central armature type receivers. What compounds this problem is that variations in diaphragm stiffness either directly or indirectly result in: (1) magnetic force variations, (2) force-deflection responses which are not uniform and linear, and (3) non-uniform acoustic power output due to non-uniform air gaps.

In addition, the prior "static" techniques require precision weights and/or threaded members to accurately effect the necessary relative movement between the diaphragm-armature and the magnet-pole piece assemblies so as to establish an air gap spacing falling within the requisite limits. Concomitantly, rather complex and expensive fixturing has also been required heretofore to restrain movement of the diaphragm-armature assembly after having been displaced by the intended amount, as well as during the subsequent movement of the pole tips against the armature, and during the welding of the pole pieces to the frame of the receiver thereafter.

Accordingly, the aforementioned "static" adjusting methods obviously could not be expected to produce an air gap for every receiver which would optimize the acoustic output thereof.

In addition, the actual acoustical output efficiencies exhibited by a given receiver heretofore could never be ascertained until the receiver was completely fabricated. As a result, if the acoustic output or stability of the receiver did not satisfy the stringest requirement demanded for a given application, the receiver either had to be discarded or a costly dis-assembly of the magnet-pole piece assembly from the frame, to which it was welded, was required.

SUMMARY OF THE INVENTION

An object of this invention is to provide a new and improved electrical transducer, such as of the central armature receiver type.

Another object of this invention is to provide new and improved methods of adjusting the air gap of and finally assembling central armature receivers in such a manner that both high stability and optimum acoustic output are realized for each receiver on a production line basis.

It is a further object of this invention to obviate the need of imparting predetermined degrees of physical displacement to the diaphragm-armature assembly relative to the frame during the adjustment of the air gap in central armature receivers.

It is an additional object of this invention to sense the attainment of optimum acoustic output in central armature receivers while the air gap is being dynamically adjusted, with permanent securement of the magnet-pole piece assembly to the frame being accomplished thereafter.

It is still another object of this invention to construct a central armature receiver in a manner which facilitates the air gap adjustment and final assembly thereof in terms of being simple, reliable, inexpensive, and in not requiring any weldments to secure the magnet-pole piece assembly to the frame of the receiver.

In accordance with the invention, central armature receivers, as embodied and claimed herein, utilize a die cast circular frame with a pair of integral, mutually disposed receptacles extending perpendicularly from the rearward, planar side of the frame. The receptacles are each adapted to receive a different one of two laterally disposed and downwardly projecting leg portions of the magnet-pole piece assembly. Each receptacle has resilient protuberances associated with at least two oppositely disposed inner walls thereof. These protuberances are positioned to engage frictionally at all times and temporarily hold the magnet-pole piece assembly after it has been positioned the proper distance from the armature so as to achieve optimum acoustic output for the receiver.

In accordance with the methods of the present invention, a transfer device gradually moves the fully magnetized magnet-pole piece assembly inwardly toward the diaphragm-armature assembly until the pole tips of the former assembly contact the armature of the latter assembly. During this movement, both an A.C. signal and a D.C. bias are applied to the coils of the receiver. After contact is made between the pole tips and armature, the transfer device is removed. Thereafter, the D.C. bias is varied from a predetermined positive value to zero and then from zero to a predetermined negative value while the acoustic output of the receiver is monitored on a suitable measuring instrument, such as an oscilloscope. If the optimum value of acoustic output falls within minimum acoustic output limits portrayed electronically or otherwise on the screen of the oscilloscope, the partially assembled receiver is tentatively considered acceptable. If the monitored acoustic output response of the receiver should indicate that there is slightly more magnetic flux in the air gap than desired, the magnet is partially demagnetized so as to effect an optimum acoustic output within the aforementioned limits. Thereafter, a variable frequency A.C. signal is applied to the coils of the finally adjusted receiver to make sure that the optimum acoustic output still falls within the predetermined limits.

Finally, the magnet-pole piece assembly is permanently secured to the receiver frame, through the receptacles, by injecting or otherwise placing either liquid cement or a potting compound into at least some of the interstices formed therebetween, and curing the cement or potting compound, if necessary.

In accordance with one embodiment of the invention, the resilient protuberances associated with each receptacle are formed by a U-shaped wire insert having two resilient, inwardly bowed leg portions, the latter being partially disposed respectively within two semi-circular grooves formed in two mutually disposed inner side walls of the associated receptacle.

In accordance with several other embodiments of the invention, the resilient protuberances associated with each receptacle of the receiver are formed by hollow plastic tubing.

In an additional embodiment of the receiver, the resilient protuberances associated with each receptacle are formed by pre-formed plastic or metal inserts having mutually disposed planar walls which are bowed to provide resiliency.

In still another embodiment of the receiver, the resilient protuberances comprise integral projections formed along two mutually disposed inner walls of each receptacle.

All of the various receiver embodiments disclosed and claimed herein exhibit the following advantages, which are by no means listed in the order of importance nor are they intended to be all inclusive.

First, the subject receiver construction and methods allow the air gap to be dynamically adjusted for optimum acoustic output in accordance with the peculiar electrical and physical characteristics of each assembly, rather than necessitating adjustment of the air gap based on some empirically derived force and/or fixed displacement values intended to produce a nominal air gap spacing for all receivers.

Secondly, the air gap of the receiver may be readily adjusted for optimum acoustic output, with the armature and pole tips of the receiver thereafter remaining in their normally spaced relationship while the magnet-pole piece assembly is secured to the frame by a suitable cement or resin. This technique makes it possible for unusable diaphragms, and/or magnets, and/or coil assemblies to be discarded before final assembly, which obviously saves considerable time and expense.

Thirdly, there is a substantial reduction in the shrinkage and growth encountered in the diaphragm-armature and magnet-pole piece assemblies during fabrication, by reason of obviating the need for welding the latter assembly to the frame of the receiver. As a result, not only is an optimum air gap initially attained, but permanently retained after final assembly of the receiver.

Fourthly, there is no need for complex and precision air gap adjusting fixtures, including accurately threaded plungers, weights, and locking rings to initially position and subsequently rigidly hold each composite receiver during a welding operation.

BRIEF DESCRIPTION OF THE DRAWINGS

FIG. 1 is an isometric view illustrating a typical central armature type of receiver;

FIG. 2 is a cross-sectional view illustrating the receiver, the air gap of which is adjusted and the magnet-pole piece assembly of which is mounted on the receiver frame in accordance with the principles of this invention;

FIG. 3 is a plan view of one of the two receptacles which form an integral part of the receiver frame and which support the magnet-pole piece assembly of the receiver;

FIG. 4 is a cross-sectional view of one receptacle taken along the lines 4—4 of FIG. 3;

FIG. 5 is a cross-sectional view of one receptacle taken along the lines 5—5 of FIG. 4;

FIG. 6 is a perspective view of the pole pieces and magnet of the receiver illustrated in FIGS. 1 and 2;

FIG. 7 is a cross-sectional view depicting the position of a resilient, U-shaped spring wire within one of the receptacles depicted in FIGS. 3–6, and also depicts the typical position of a portion of the pole pieces of the magnet-pole piece assembly within the receptacle, as well as the manner in which the pole pieces are initially secured by frictional contact with the wire and subsequently and permanently secured to the frame by being embedded within a suitable potting cement or resin;

FIG. 8 is a front elevational view depicting in simplified form apparatus of the type capable of carrying out the method steps involved in adjusting the air gap of and finally assembly a central armature receiver in accordance with the principles of the present invention;

FIGS. 9–11 correspond generally to FIGS. 3–5, but further illustrate the use of plastic resilient tubes which are positioned within associated grooves of the receptacles for frictionally holding the magnet-pole piece assembly temporarily at the proper elevation relative to the diaphragm-armature assembly in accordance with another embodiment of the invention;

FIGS. 12–14 correspond generally to FIGS. 3–5, but further illustrate the use of a substantially H-shaped resilient, one-piece molded plastic insert with hollow leg portions for temporarily holding the magnet-pole piece assembly in accordance with another embodiment of the invention;

FIGS. 15–17 also correspond generally to FIGS. 3–5, but further disclose the use of a pre-formed, U-shaped metal insert with inwardly bowed planar leg portions for temporarily holding the magnet-pole piece assembly within each receptacle in accordance with still another embodiment of the invention, and FIGS. 18–20 likewise correspond generally to FIGS. 3–5, but distinguish therefrom in that an integral, triangularly shaped projection is formed along two mutually disposed inner walls of each receptacle to provide resilient protuberances for frictionally holding temporarily the magnet-pole piece assembly in accordance with still another embodiment of the invention.

DETAILED DESCRIPTION

With particular reference now to FIGS. 1 and 2, there is depicted a central armature receiver unit 10, simply referred to as a receiver hereinafter, comprising a generally circular frame member 12, preferably of die cast aluminum, die cast zinc alloy, or molded plastic material, indirectly supporting on its rearward side a magnet 13, such as one designated Alnico VIII, and a pair of pole pieces 14 made, for example, of 45% permalloy, mutually disposed on opposite sides of and secured to the magnet. As best seen in FIG. 6, each pole piece is substantially T-shaped, and comprises a pole tip 14a at the terminating end of a downwardly extending central leg portion 14b, two lateral leg portions 14c and two downwardly extending leg portions 14d having slightly bent terminating ends. The portion 14b of each pole piece extends through an aperture 15 (best seen in FIG. 2) in the frame, with the pole tip 14a thereof thus projecting outwardly a short distance from the front side of the frame. The manner in which the magnet-pole piece assembly is secured to the frame of the receiver will be described in greater detail hereinbelow.

A circular, inwardly bowed diaphragm 16 is supported in substantially free space relationship relative to the frame by having a slightly raised outer annular portion 17 resting on a recessed seating surface 18 of the frame 12. An inner shoulder 19 associated with the seating surface 18 mates with a rim 20 of the diaphragm and insures that the latter properly seats in the frame 12 and remains axially aligned therewith. The diaphragm 16 has a central aperture 21 in which a slightly formed circular armature 23 is retained, the armature being made, for example of 2% Vanadium Peremendur. The armature is formed to permit its central flat area to project above the retaining diaphragm material and, as best seen in FIG. 2, is supported by a die-formed crimping groove 24 in the diaphragm. Supported in this manner, it is thus seen that the armature is suspended in freespace relationship from the interior of the frame and from the pole tips 14a of the pole pieces.

As previously pointed out, it is the air gap spacing between the armature 23 and the pole tips 14a that is of critical importance in the assembly of central armature receivers if optimum acoustic output and uniform stability are to be realized.

A protective grid 25 is supported about its periphery by an annular clamping member 26, which is ferruled over an outer annular shoulder 27 of the frame 12 to protect the diaphragm-armature assembly. The grid has a plurality of apertures 28 formed within the intermediate planar surface area thereof so as not to inhibit or adversely affect the acoustic output response of the receiver. A thin membrane 29 such as of polyethylene, is clamped between the inner side of the protective grid 25 and the frame 12, to cover the apertures 28 in the grid so as to minimize foreign materials from collecting on the diaphragm. The membrane is dimensioned and arranged so as to minimize distortion of full frequency response of the receiver.

As also best seen in FIG. 2, two electrical coils 31 respectively surround central, downwardly extending leg portions 14b (see FIG. 6) of the pole pieces. Electrical connections to the coils are brought out to a pair of terminal strips 35 which are isolated from the receiver frame 12 by a molded plastic block 37. The block 37 is secured to the frame by a pair of protuberances 38 which are integrally formed in the block. The protuberances are initially inserted through aligned apertures in the frame, with the projecting ends of the protuberances thereafter being flared outwardly so as to wedge against the outer adjacent surfaces of the frame.

As depicted in FIG. 1, the upper planar surface of each terminal strip includes a die-formed single thread terminal 39 which facilitates making a screw-threaded connection with external circuitry. Additional terminals 41, 42 are also formed in the terminal strip for connecting the associated coil leads to the terminal strip, and for connecting a click reducing device (not shown) in parallel with the coil leads. It should be understood, of course, that the type of terminals associated with the terminal strip may take any one of a number of different forms, and may comprise separate terminals which are only supported on the terminal strip. Accordingly, the specific terminals described herein are intended to be illustrative only.

As thus far described, the receiver basically resembles prior versions thereof. The additional structure to be described now, however, with specific reference first to FIGS. 1 and 3–5, departs considerably from the prior versions, as do the methods of air gap adjusting and final assembly involved therewith.

As best seen in FIG. 1, the opposite, laterally disposed pairs of pole piece leg portions 14d are respectively confined within a different one of a pair of mutually disposed and substantially U-shaped receptacles designated generally by the reference numeral 43. These receptacles, in accordance with the principles of this invention, are formed as an integral part of the receiver frame 12, and extend perpendicularly outward from the rearward side thereof. As the two mutually disposed receptacles 43 are of identical construction, reference will generally be made hereafter to only one of them in connection with each of the various embodiments thereof to be disclosed and claimed.

As illustrated in FIGS. 3–5, each receptacle 43 comprises a pair of mutually disposed leg extensions 45, with semi-circular recesses 47 formed in the opposite inner side walls thereof. An intermediate pair of mutually disposed side walls 48 together with leg extensions 45 define a reservoir 49.

In accordance with one embodiment of the invention, as depicted in FIG. 7, a substantially U-shaped resilient wire 61 is dimensioned such that the vertically extending and slightly bowed leg sections thereof are respectively positioned within the semi-circular grooves 47 of the associated leg extensions 45 of the receptacle. The U-shaped wire may, for example, be made of steel, although ohter metals and/or alloys may also be used with equal effectiveness.

Regardless of what material the wire insert is made, the purpose thereof, in accordance with the principles of this invention, is to frictionally engage the pole piece leg portions 14d, and thereby temporarily support the magnet-pole piece assembly during the air gap adjusting and final assembly of the receiver. The methods involved to this end will be described in greater detail hereinafter. However, attention at this point is directed to the fact that in accordance with the invention, and as disclosed in FIG. 7, a potting resin or compound 63, preferably in liquid form initially, is injected or placed in any other suitable manner into at least the base region of the reservoir 49 after the magnet-pole piece assembly has been adjusted to the requisite position within receptacles 43, which position results in an air gap establishing optimum acoustic output for the receiver. By way of example, any one of a number of commercially available two-part thermosetting resins and hardeners may be employed as a potting medium. Such a potting medium may be cured at either room temperature or at slightly elevated temperatures if a shorter curing time is desired, and when it hardens, the pole-piece leg portions 14d partially embedded therein results in the entire magnet-pole piece assembly being rigidly and permanently secured to the frame of the receiver.

The method of adjusting the air gap and finally assembling a central armature receiver of the type depicted in FIGS. 1–7 will now be described in detail.

As illustrated in FIG. 8, the magnet 13 and pole pieces 14, as a soldered or otherwise fastened assembly, is initially mounted within a suitable gripping mechanism 70, including a pair of pivotally actuated, spring-biased jaws 71. While a pair of pneumatic cylinders 72 are pictorially shown as the means for actuating the jaws, it is to be understood, of course, that many other types of apparatus, such as cam operated mechanisms, could be utilized with equal effectiveness. The gripping mechanism is supported on a reciprocating device, such as a ram 73, so as to be positioned above a receiver frame 12, supported in a suitable stationary nest 75. At this stage of assembly, the receiver frame has mounted thereon a diaphragm 16, armature 23, grid 26, coils 31 and terminal strips 41.

Upon the fixture 70 (holding a magnet-pole piece assembly) being lowered so that the pole piece leg portions 14d are brought into frictional engagement with the resilient U-shaped wires 61, which are positioned within the receptacles 43, an A.C. signal having a frequency, for example, of 1,000 cycles per second is applied to the receiver coils 31 from a source 79. In addition to the alternating current signal, a direct current bias of approximately 250–300 milliamperes for one particular type of receiver is simultaneously applied to the coils. The polarity of the bias current is chosen so as to aid the permanent magnet 13 in attracting the armature 23 toward the pole tips 14a of the magnet-pole piece assembly until they are so close that contact is finally abruptly made therebetween due primarily to magnetic attraction. This contact with both the A.C. signal and the D.C. bias applied to the coils of the receiver is referred to as the "freeze point."

After the pole tips 14a contact the armature 23 of the receiver, previously defined as the "freeze point," the transfer device 70 is removed so as to permit the stressed structural components, including the die-cast frame, to relax and acquire a normal state. Thereafter, the D.C. bias is gradually reduced or swept in amplitude from approximately +225 milliamperes down to zero and then from zero to approximately −150 milliamperes. The resulting variable acoustic output energy produced by the receiver is in turn received by a reproducing instrument, such as a sensitive, calibrated microphone 81. The microphone re-converts the received acoustic energy into electrical energy, with the latter then being fed to a suitable measuring instrument, such as an oscilloscope 83.

During this time, and with the A.C. signal of 1,000 c.p.s., still applied to the coils of the receiver, an operator monitors the oscilloscope and ascertains whether or not the optimum value of acoustic output produced by the receiver falls within predetermined limits portrayed by suitable means, electronically or otherwise, on the screen of the oscilloscope. These limits are objectably determined i.e., they are initially established by choosing a permissible lower level of acoustic output for a representative receiver which, if attained when the receiver is finally assembled, will insure that the receiver will normally function satisfactorily in the field, even if subjected to adverse conditions, such as rough handling, stray magnetic fields, etc. Through the use of the oscilloscope, the chosen lower level of acoustic output which, by way of example, is 2 db below the peak output for one particular receiver, is readily defined by and visually displayed as the lower one of two spaced 2 db limit points derived from an acoustic output response curve representative of all receivers of a given design. The profile of this response curve typically has a bell-shaped distribution.

If upon varying the D.C. bias current from approximately +225 milliamperes to zero and then from zero to −150 milliamperes an optimum value of acoustic output is established within the aforementioned predetermined limits, the receiver is tentatively considered to be acceptable. However, if the optimum value of acoustic output registers on the oscilloscope beyond that one (higher) of the two predetermined limits which reveals that more biasing current and, thereby more flux in the air gap, is required than can normally be produced by a fully magnetized permanent magnet, then the receiver is considered to be defective. This condition would normally arise as a result of a defective diaphragm-armature assembly, however, other defects in certain of the other components which make up the composite receiver could also produce the same monitored condition.

As for those partially assembled receivers which exhibit an optimum value of acoustic output beyond the other (lower) predetermined limit which reveals that less magnetic flux is required in the air gap than is presently produced by the permanent magnet, the next step is to demagnetize the permanent magnet slightly, such as through the application of an externally applied field, to a degree which results in the optimum acoustic output of the receiver being effectively shifted so as to fall within the aforementioned limits, as indicated on the oscilloscope. During this adjustment, of course, the A.C. signal of 1,000 c.p.s., is still applied to the coils of the receiver.

After the receiver has been physically and magnetically tested in accordance with the aforementioned steps of the subject method, an alternating current signal which sweeps, for example, from zero to 4,000 cycles per second is applied to the receiver coils 31 from a source 85, through a suitable electrical switch 86. The receiver in turn translates the alternating current signal into acoustic output energy which again is picked up by the microphone 81, reconverted into electrical energy and then fed to the measuring oscilloscope 83. By observing the conformance of the receiver response characteristics to the predetermined limit requirements portrayed on the screen of the oscilloscope, the acceptance or rejection of the receiver is determined for the last time prior to the final assembly operation.

The final step in the assembly of the receiver involves permanently securing the magnet-pole piece assembly to the receptacles, and thereby to the frame 12 of the receiver. This is accomplished in accordance with the principles of the invention by injecting or otherwise placing either a liquid cement or a potting compound into the reservoirs 49 so as to partially embed the pole piece leg portions 14d. This injected material, as previously mentioned, may comprise a two-part thermosetting resin and hardener, and may be cured either at room temperature or at an elevated temperature, depending both upon the time allowed for curing and the nature of the material employed. The resulting receiver structure, with the pole piece leg portions 14d being partially embedded in the potting compound, effects rigid and permanent securement of the magnet-pole piece assembly to the frame of the receiver.

Advantageously, the above-described method of adjusting the air gap and finally assembling the composite receiver obviates the need for expensive, precision made threaded plungers and/or weights, permits optimum air gap adjustment based on the peculiar physical, magnetic and electrical characteristics of each receiver, and obviates shrinkage or growth problems associated with the air gap between the armature of the diaphragm-armature assembly and the pole tips of the magnet-pole piece assembly normally caused by the use of welds to secure the magnet-pole piece assembly to the frame. The present method also makes it possible to ascertain whether a given receiver can be adjusted within predetermined acoustic output limits before the magnet-pole piece assembly is permanently secured to the frame of the receiver. This naturally reduces manufacturing costs, reduces the number of defective receivers and facilitates large scale manufacture through the use of manufacturing steps and apparatus which are simpler and more efficient than those required heretofore.

FIGS. 9–11 depict three views of one of a pair of receptacles generally corresponding to the air depicted in FIGS. 3–5 and 7, but distinguishing therefrom by the utilization of short, straight sections of hollow tubing 91 which are initially supported within the semi-circular grooves 47 of the leg extensions 45 by means of a substantially U-shaped, pre-formed wire base 93. More specifically, the end of each short, vertically extending leg portion of the wire is inserted into the lower end portion of the aligned hollow plastic tube.

As a modification of this embodiment, short, straight, vertically extending sections of tubing could be used without the interconnecting wire 93 by seating the lower end of each section of tubing, for example, in a bore at the base of the semi-circular groove 47 of the associated receptacle. Concomitantly, the hollow tubing could simply comprise one piece formed into a U-shaped configuration in a manner similar to the wire 61 depicted in the receiver embodiment of FIGS. 1–7, with the possible exception that the vertically extending leg portions would normally be straight.

In all cases, the plastic tubing may, for example, be made of nylon, although other types of resilient plastic material may also be used with equal effectiveness. In all other respects, the receptacle and the function of the tubing depicted in FIGS. 9–11 correspond to the wire counterpart described in detail in connection with FIGS. 1–7.

FIGS. 12–14 likewise depict a variation of the composite receptacle 43 depicted in FIG. 7, through the utilization of a one-piece molded plastic insert 95 having hollow, mutually disposed, vertically extending resilient leg portions 96. Rather than being formed to be substantially U-shaped, as the wire 61 in FIG. 7, insert 95 is essentially H-shaped having an integral, horizontal rib portion 96a spaced a short distance from the bottom ends of the vertical resilient leg portions 96 so as to provide greater rigidity to the insert.

FIGS. 15–17 illustrate another variation of the composite receptacle 43 of FIG. 7, wherein a substantially U-shaped metal insert 97, having substantial width, is utilized in place of the U-shaped wire 61 depicted in FIG. 7. The vertically extending and mutually disposed leg portions 98 of the metal insert 97 are slightly bowed inwardly so as to provide the necessary resiliency to frictionally engage and hold the magnet-pole piece assembly during the air gap adjusting and final assembly thereof. Insert 97 could also be made of plastic.

FIGS. 18–20 illustrate still another variation of the composite receptacle 43, wherein a plurality of triangularly shaped projections 99 are integrally formed as a part of each vertically extending leg extension 45 of the channel, with the substantially sharp protuberances or edges 99a providing sufficient resiliency and/or deformation characteristics so as to frictionally engage and temporarily hold the magnet-pole piece assembly by metal-to-metal contact. The integral metal projections 99 thus obviate the need for separate resilient protuberances, such as employed in the various receptacle embodiments described hereinabove. The continuous contacting edges 99a disclosed in FIGS. 18–20 could, of course, be formed as a saw-tooth or herringbone type edge, or simply comprise a plurality of uniformly or randomly spaced contact protuberances of any other configuration.

It is to be understood that the specific illustrative structural embodiments and associated methods disclosed herein are merely illustrative of the general principles of the present invention. Various other modifications may be devised in light of this disclosure by one skilled in the art without departing from the spirit and scope of this invention.

What is claimed is:

1. An electrical transducer of the central armature receiver type wherein a diaphragm-armature assembly supported on one side of a supporting frame, and a magnet-pole piece assembly together with associated inductive coil means supported on the opposite side of said frame, further comprises:

two spaced receptacles integral with said frame and extending outwardly therefrom for respectively receiving different laterally disposed leg portions of the magnet-pole piece assembly;

resilient protuberances associated with said receptacles for frictionally engaging the received laterally disposed leg portions of the magnet-pole piece assembly, said protuberances temporarily supporting said assembly at the proper position relative to said diaphragm-armature assembly, and hardened material of an initially solidifiable type filling at least certain interstices formed between inner surfaces of each of said receptacles and respectively adjacent surfaces of the associated leg portion of said magnet-pole piece assembly, thereby rigidly and permanently securing said magnet-pole piece assembly to the frame of the transducer.

2. An electrical transducer in accordance with claim 1, wherein said resilient protuberances comprise two elongated contact edges integrally formed in two mutually disposed inner surfaces of each of said receptacles.

3. An electrical transducer in accordance with claim 1, wherein said resilient protuberances comprise two substantially U-shaped inserts each having resilient leg portions, said inserts being respectively positioned within said receptacles and oriented therein such that the resilient leg portions of each insert frictionally engage the received associated leg portions of said magnet-pole piece assembly.

4. An electrical transducer in accordance with claim 3, wherein at least the parallel extending leg portions of each substantially U-shaped insert are formed of hollow, resilient plastic tubing.

5. An electrical transducer in accordance with claim 3, wherein each of said substantially U-shaped inserts is formed in one piece and of metal, with the mutually disposed leg portions thereof being bowed inwardly toward each other.

6. An electrical transducer in accordance with claim 3, wherein each of said substantially U-shaped inserts is formed in one piece and of plactic.

7. An electrical transducer in accordance wtih claim 3, wherein each of said substantially U-shaped inserts comprises a lower U-shaped metal portion with short, parallel extending leg sections, and an upper plastic portion including two resilient, parallel extending hollow plastic leg sections, each hollow plastic leg section being temporarily supported at its lower end by an aligned and at least partially inserted end region of one of the two metal leg sections of said U-shaped metal portion of the insert.

8. An electrical transducer of the central armature receiver type, wherein a diaphragm-armature assembly supported on one side of a supporting frame, and a magnet-pole piece assembly, together with associated inductive coil means, supported on the other side of said frame, further comprises:
- two substantially U-shaped receptacles spaced apart and integrally formed wtih said frame, each of said receptacles defining an open-ended reservoir at its lower end adjacent said frame, said receptacles being spaced apart and each adapted to receive different portions of said magnet-pole piece assembly;
- a separate one-piece, substantially U-shaped resilient insert position within each of said receptacles and oriented such that the mutually disposed leg portions thereof frictionally engage and temporarily hold the magnet-pole piece assembly at a readily adjusted elevation necessary to establish the desired air gap between pole tips of the magnet-pole piece assembly and the armature of said diaphragm-armature assembly, and
- hardened material, initially introduced in a solidifiable state, encompassing at least certain interstices formed between the walls defining said reservoir of each of said receptacles and the adjacent surface of that portion of said magnet-pole piece assembly received therewithin, said hardened material thereby rigidly and permanently securing said magnet-pole piece assembly to said frame.

9. An electrical transducer in accordance with claim 8, wherein each of said receptacles has two mutually disposed inner walls with recesses therein, the leg portions of said U-shaped inserts being at least partially seated within said recesses.

10. An electrical transducer in accordance with claim 8, wherein at least the mutually disposed leg portions of said U-shaped inserts are of hollow, tubular plastic construction.

11. An electrical transducer in accordance with claim 8, wherein said U-shaped inserts are of metal, with the mutually disposed leg portions thereof having inwardly bowed, planar surfaces.

12. An electrical transducer in accordance with claim 8, wherein said hardened material comprises a two-stage thermosetting resin initially introduced within said reservoirs in liquid form.

No references cited.

KATHLEEN H. CLAFFY, Primary Examiner

T. L. KUNDERT, Assistant Examiner

U.S. Cl. X.R.

179—114